United States Patent [19]

Tsuchiya et al.

[11] Patent Number: 5,633,752
[45] Date of Patent: May 27, 1997

[54] OPTICAL SWITCHING APPARATUS FOR A REFLECTED FLUORESCENCE MICROSCOPE

[75] Inventors: Atsuhiro Tsuchiya, Akigawa; Itaru Endo, Hachioji, both of Japan

[73] Assignee: Olympus Optical Co., Ltd., Tokyo, Japan

[21] Appl. No.: 504,322

[22] Filed: Jul. 19, 1995

[30] Foreign Application Priority Data

Jul. 27, 1994 [JP] Japan .................................. 6-175321

[51] Int. Cl.⁶ .......................... G02B 21/06; G02B 21/00; G02B 7/02
[52] U.S. Cl. .......................... 359/390; 359/368; 359/389; 359/821
[58] Field of Search ........................ 359/227–230, 359/236, 355–359, 368–390, 885–892, 814, 821; 351/213–218, 433–236

[56] References Cited

U.S. PATENT DOCUMENTS

| | | | |
|---|---|---|---|
| 3,918,793 | 11/1975 | Kraft | 359/389 |
| 4,753,525 | 6/1988 | Gaul et al. | 359/390 |
| 4,756,611 | 7/1988 | Yonekubo et al. | 359/389 |
| 5,128,808 | 7/1992 | Dosaka | 359/821 |
| 5,371,624 | 12/1994 | Nagano et al. | 359/368 |

FOREIGN PATENT DOCUMENTS

| | | |
|---|---|---|
| 56-196605 | 5/1981 | Japan . |
| 1447166 | 8/1976 | United Kingdom . |

*Primary Examiner*—Thong Nguyen
*Attorney, Agent, or Firm*—Frishauf, Holtz, Goodman, Langer & Chick

[57] ABSTRACT

An optical system switching apparatus for a reflected fluorescence microscope including a first turret having a plurality of first windows which are formed at an equal distance from a rotation center axis and on which absorption filters are mounted, a second turret having a plurality of second windows which are formed at an equal distance from the rotation center axis and on which excitation filters are mounted, a third turret having a plurality of mounting portions which are formed at an equal distance from the third rotation center axis and on which dichroic mirrors are mounted. The first to third turrets are assembled to be rotatable independently of each other, for optically aligning an arbitrary one of the excitation filters an arbitrary one of the dichroic mirrors, and an arbitrary one of the absorption filters at respective rotational positions.

14 Claims, 6 Drawing Sheets

OPTICAL SWITCHING APPARATUS FOR A REFLECTED FLUORESCENCE MICROSCOPE

BACKGROUND OF THE INVENTION

1. Field of the Invention

The present invention relates to an optical system switching apparatus for a reflected fluorescence microscope.

2. Description of the Related Art

Figure 4:
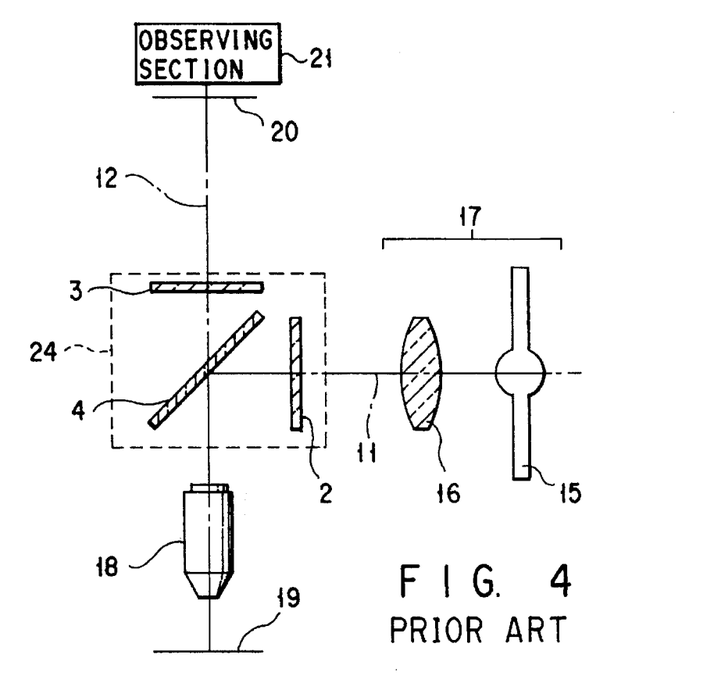
FIG. 4 is a schematic diagram showing the basic structure of the illumination/observation optical system of the reflected fluorescence microscope.

Generally, the illumination/observation optical system of a reflected fluorescence microscope has an arrangement as shown in FIG. 4. Referring to FIG. 4, illumination light from a light-projecting unit 17 having a light source 15 and a lens 16 for projecting light emitted from the light source 15, is emitted toward an excitation filter 2. The emerging illumination light (the optical axis of which is denoted by reference numeral 11) is subjected to wavelength selection by the excitation filter 2, and only illumination light having the selected wavelength is transmitted through the excitation filter 2. The illumination light (excitation light) which has been subjected to wavelength selection by the excitation filter 2 is further subjected to wavelength selection by a dichroic mirror 4, and selected illumination light is reflected by the dichroic mirror 4 downward, as shown in FIG. 4. The reflected light passes through an objective lens 18 along an observation optical axis 12 and reaches a sample surface 19. The dichroic mirror 4 is inclined at 45° with respect to the illumination optical axis 11 and the observation optical axis 12.

The sample is impregnated with a fluorochrome or fluorescent pigment in advance. Thus, the sample surface 19 generates fluorescence when excited with excitation light. This fluorescence forms an image through the objective lens 18. While forming an image, the fluorescence is transmitted through the dichroic mirror 4 and subjected to wavelength selection by an absorption filter 3, so that only a fluorescence component having the selected wavelength is transmitted through the absorption filter 3. The fluorescence transmitted through the absorption filter 3 forms an image on an image formation plane 20 because of the operation of the objective lens 18. This image is observed with an observing section 21, e.g., an eyepiece or a television camera.

In actual observation, the wavelengths of optimum excitation light to be irradiated on the sample and of the fluorescence generated by the sample differ depending on the types of the fluorochromes to be used by the sample. Accordingly, the excitation filter 2, the absorption filter 3, and the dichroic mirror 4 must be switched as appropriate as required in accordance with the sample, i.e., the fluorochrome impregnated in the sample. An optical system switching apparatus 24 is generally used for this purpose.

Figure 5:
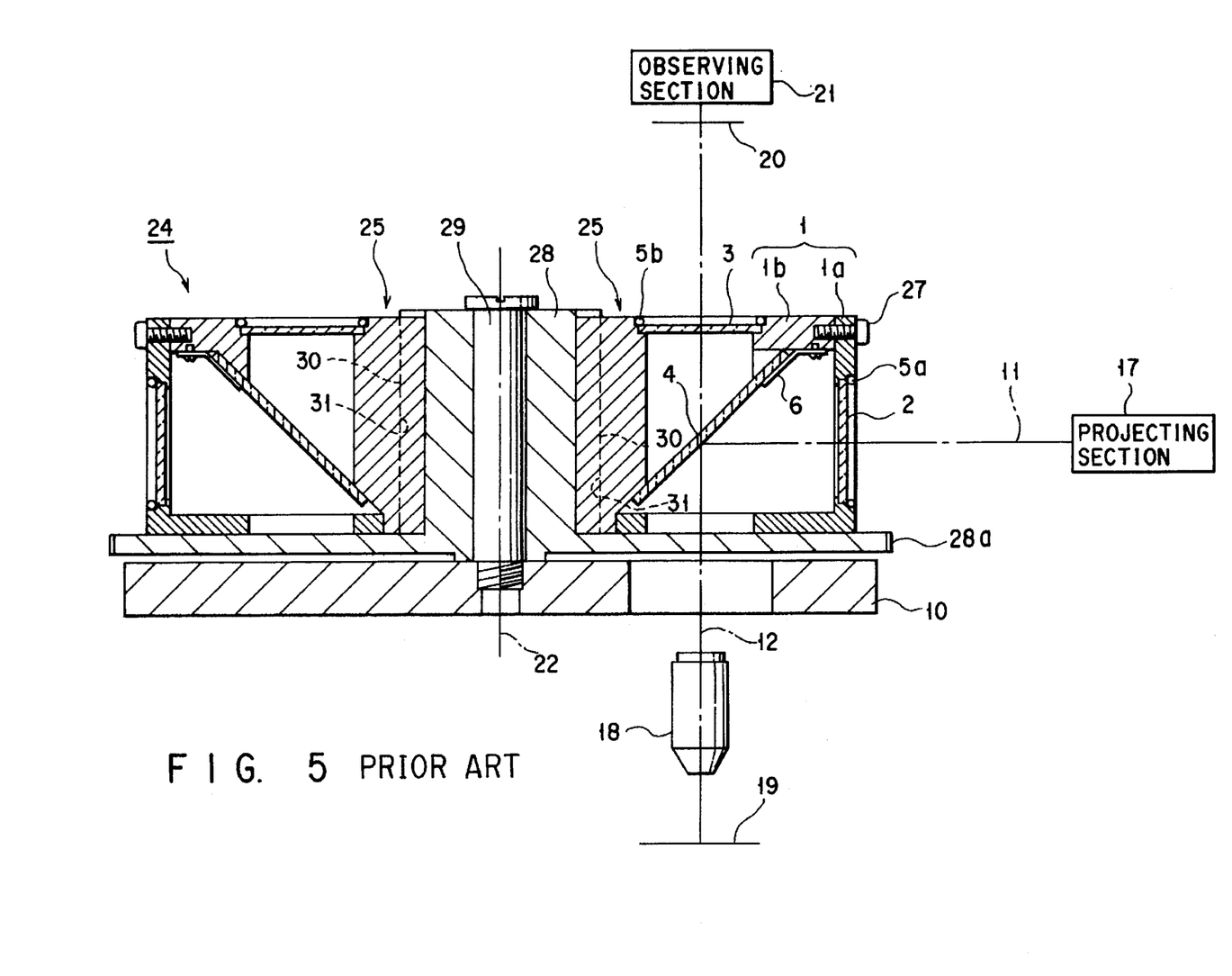
FIG. 5 is a side sectional view showing the conventional optical system switching apparatus of a reflected fluorescence microscope.

FIG. 5 shows an example of an arrangement of the conventional optical system switching apparatus 24. This optical system switching apparatus 24 includes a turret 28 having a circular disk-like horizontal rest portion and a cylindrical supporting portion raised on the center of the rest portion through which a shaft 29 is coaxially inserted, and four cubes 25 (only two are shown in FIG. 5). The shaft 29 is fixed to a base 10 of the microscope body, so that the turret 28 is about a central axis 22 of the shaft 29. The four cubes 25 are concentrically arranged around the central axis 22 on the horizontal rest portion and detachably mounted on the turret 28.

Each cube 25 has a cube frame 1 consisting of two cube frame sections 1a and 1b fixed to each other with a screw 27. An excitation filter 2 is detachably mounted to a window of the cube frame section 1a with a set ring 5a. An absorption filter 3 is detachably mounted to a window of the cube frame section 1b with a set ring 5b. A dichroic mirror 4 is detachably mounted to the cube frame 1b with a leaf spring 6.

Four slidable projecting ridges 30 (only two are shown in FIG. 5) are formed on the outer circumferential surface of the cylindrical support portion of the turret 28 at an angular interval of 90° to extend along the cylindrical support portion. A slide groove 31 is formed in one outer surface of each cube frame 1. The four cubes 25 are mounted to the turret 28 by fitting the slidable projecting ridges 30 in the corresponding slide grooves 31 and sliding the cubes 25 from above. The base 10 is threadably engaged with the lower end portion of the shaft 29 on which the turret 28 is rotatably mounted. The base 10 may be fixed to the microscope body in an optically desired position, thereby fixing the optical system switching apparatus 24 to the microscope body. Simultaneously, the reflecting surface of the dichroic mirror 4 is arranged at a position where a predetermined illumination optical axis 11 and an observation optical axis 12 intersect.

The operator can select a desired one of the four cubes 25 and arrange it in the illumination/observation optical path by touching a knurling portion 28a formed on the outer circumference of the horizontal rest portion of the turret 28 and rotating the turret 28 about the central axis 22 as the center. More specifically, an appropriate combination of an excitation filter 2, an absorption filter 3, and a dichroic mirror 4 can be used in the illumination/observation optical path in accordance with the fluorochrome impregnated in the sample.

Publications that disclose apparatuses of this type include Jpn. Pat. Appln. KOKOKU Publication No. 56-19605.

With the conventional optical system switching apparatus described above, however, although the combination of the excitation filter 2, the absorption filter 3, and the dichroic mirror 4 can be switched by selecting the cube 25, the excitation filter 2, the absorption filter 3, and the dichroic mirror 4 cannot be switched separately. For example, when observing samples colored with different fluorochromes, if the fluorescence components have different excitation band widths such as wide band width/narrow band width but close excitation spectra, only the excitation filter 2 need be exchanged in accordance with the excitation band width. In the conventional apparatus, however, since it is impossible to switch only the excitation filter 2, two cubes 25 are set to have the same absorption filters 3 and the same dichroic mirrors 4 while employing different types of excitation filters 2 having different band widths. Alternatively, the cubes 25 are removed from the turret 28 and disassembled, and the excitation filters 2 are exchanged for new ones.

Of the above cases, when two cubes 25 are to be prepared, two identical absorption filters 3 and two identical dichroic mirrors 4 must be prepared, and the number of types of absorption filters 3 and the number of types of dichroic mirrors 4 that can be used simultaneously by the entire switching apparatus are decreased to three each. It is also cumbersome to exchange the excitation filters 2.

One known observation method using a reflected fluorescence microscope is the ratio imaging method. The conventional optical system switching apparatus has a problem in executing this method as well. In the ratio imaging method, a fluorochrome whose the excitation spectrum changes as it is coupled with a material in the living body as the observation target is employed. This excitation spectrum is represented by excitation light having two specific wavelengths. The fluorescence intensities caused by this two-wavelength excitation light are measured, and the ratio in the fluorescence intensities is examined. A change over time of this ratio of the fluorescence intensities is regarded as a change in excitation spectrum of the fluorochrome, thereby indirectly obtaining a ratio with which the material in the living body is coupled with the fluorochrome. More specifically, when the fluorescence intensity is observed as an image, the ratio with which the material in the living body is coupled with the fluorochrome can be obtained. To know the coupled state of the material in the living body with the fluorochrome, a change over time of this image must be observed. For this purpose, an excitation filter 2 must be continuously switched to continuously change the excitation light described above between two wavelengths. In this case, since the number of light-measuring wavelengths having the fluorescence intensities selected by an absorption filter 3 is one, the absorption filter 3 need not be switched. Since the difference between the two wavelengths of the above excitation light is not very large, and an optical element that can reflect the two-wavelength excitation light is used as a dichroic mirror 4, the dichroic mirror 4 need not be switched.

Accordingly, of the excitation filter 2, the dichroic mirror 4, and the absorption filter 3, only the excitation filter 2 need be switched. In the conventional optical system switching apparatus, however, the excitation filter 2 can be switched only as a whole cube 25. As described above, in the ratio imaging method, as the excitation light must be continuously switched to observe a change over time, if the excitation filter 2 is switched by removing the cube 25, the switching operation cannot catch up with the change over time. Therefore, two excitation filters 2 of different types, two dichroic mirrors 4 of one type, and two absorption filters 3 of one type must be mounted to two cubes 25, and these cubes 25 must be switched. Therefore, two identical absorption filters 3 and two identical dichroic mirrors 4 must be used.

Furthermore, as the absorption filter 3 and the dichroic mirror 4 are also switched simultaneously when the excitation filter 2 is switched, an error occurs in the inclination or parallelism of the absorption filter 3 or dichroic mirror 4. As this adversely affects the observation optical axis, a positional error may occur in the image, so that the ratio of the fluorescence intensities may not be precisely measured in terms of position.

Figure 6:
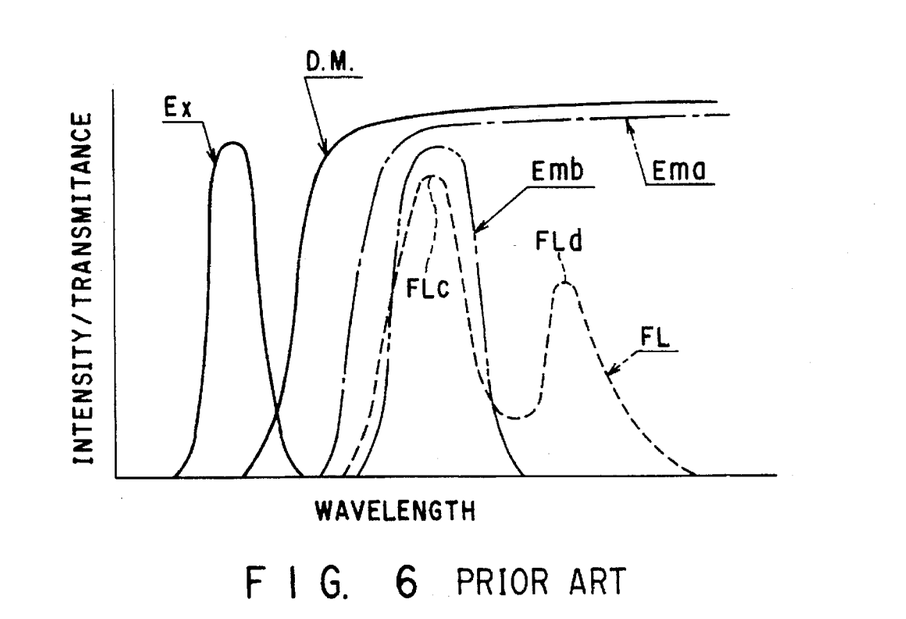
FIG. 6 is a graph showing the filter characteristics and fluorescence spectrum characteristics of fluorescence observation employing two-color dyeing.

In recent years, fluorescence observation employing multi-color dyeing is widely performed. The conventional optical system switching apparatus has a problem in this respect as well. The filter characteristics and fluorescence spectrum characteristics of fluorescence observation employing two-color dyeing will be described with reference to FIG. 6. In FIG. 6, an ordinate represents the transmittance or fluorescence intensity of the filter 2 or 3, or the transmittance of the dichroic mirror 4, and an abscissa represents the wavelength. Two absorption filters a and b of different types will be used as absorption filters 3.

Referring to FIG. 6, reference symbol $E_X$ denotes the spectral transmittance curve of the excitation filter 2; D.M., the spectral transmittance curve of the dichroic mirror 4; $E_{ma}$, the spectral transmittance curve of the absorption filter a to be described later; and $E_{mb}$, the spectral transmittance curve of the absorption filter b to be described later. A curve FL indicates the intensity of the fluorescence generated by the sample.

In this observation method, only excitation light of the same wavelength indicated by the curve $E_X$ is transmitted through the excitation filter 2, and this excitation light is irradiated on the sample. The characteristics of the dichroic mirror 4 are indicated by the curve D.M. The dichroic mirror 4 does not transmit the excitation light therethrough but reflects it toward the sample.

The two types of fluorochromes impregnated in the samples are excited with excitation light having the same wavelength indicated by the curve $E_X$ to generate fluorescence. The respective fluorochromes have different fluorescence spectra. More specifically, the wavelength of the fluorescence generated by a fluorochrome C is mainly located near a peak $FL_c$ while the wavelength of the fluorescence generated by a fluorochrome D is mainly located near a peak $FL_d$. Accordingly, to observe the fluorescence components generated by the fluorochromes C and D simultaneously, the absorption filter a (refer to the transmittance curve $E_{ma}$) capable of transmitting both the peaks $FL_c$ and $FL_d$ is used, and to observe only the fluorescence component generated by the fluorochrome C, the absorption filter b (refer to the transmittance curve $E_{mb}$) capable of transmitting only a wavelength near the peak $FL_c$ is used. As is apparent from the curves FL and D.M., the dichroic mirror 4 transmits fluorescence components of all the wavelength bands generated by the sample.

Therefore, in fluorescence observation employing multi-color dyeing, usually, the excitation filter 2 and the dichroic mirror 4 may be used unchanged while only the absorption filter 3 must be switched. In the conventional optical system switching apparatus, however, since switching can be performed only in units of cubes 25, two cubes 25 having the same excitation filters 2 and the same dichroic mirrors 4 but different absorption filters 3 must be prepared, and the cubes 25 must be switched. In this case, an inconvenience occurs similar to that which occurs when only the excitation filter 2 is to be switched, as described above.

Furthermore, recently, an absorption filter 3 and a dichroic mirror 4 both having a plurality of transmission bands have been developed. In exciting the fluorochromes of a sample dyed in multiple of colors, they enable observation of a fluorescent image having a high contrast through separation of fluorescence components caused by the respective fluorochromes, only by switching only the excitation filter 2 without switching the absorption filter 3 or the dichroic mirror 4. In this case, as the image does not cause a positional error due to switching of the absorption filter 3 or the dichroic mirror 4 described above, these absorption filter 3 and dichroic mirror 4 are preferable for photographing of a multi-exposure photograph or image analysis in accordance with multi-exposure with a television camera. In the conventional optical switching apparatus, however, the excitation filter 2 of the cube 25 must be switched, leading to a cumbersome operation.

SUMMARY OF THE INVENTION

It is an object of the present invention to provide an inexpensive optical system switching apparatus for a reflected fluorescence microscope in which a plurality of types of excitation filters, absorption filters, and dichroic mirrors can be switched separately and quickly so as to be combined arbitrarily and which does not require a large space.

According to the present invention, when the operator selectively rotates three turrets, appropriate excitation filter, dichroic mirror, and absorption filter can be switched separately and quickly, so that they can be combined arbitrarily and arranged in an optical path.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

The first to third embodiments of the present invention will be described in detail with reference to FIGS. 1A to 3.

Figure 1A:
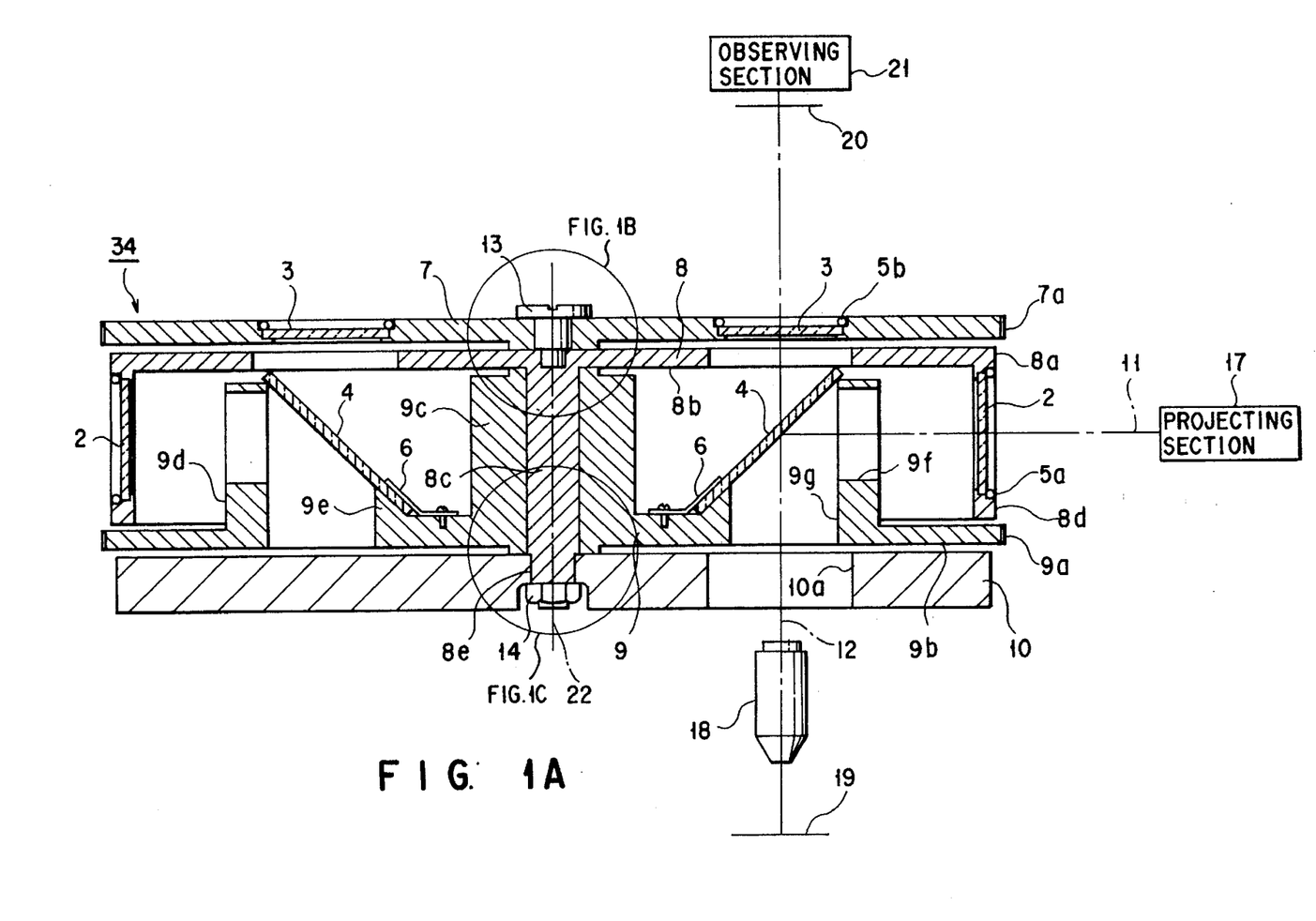
FIG. 1A is a side sectional view showing the optical system switching apparatus of a reflected fluorescence microscope according to the first embodiment of the present invention.

FIG. 1A shows an optical system switching apparatus 34 according to the first embodiment. As shown in FIG. 1A, this optical system switching apparatus 34 is mounted on a stepped shaft 13 fixed to a microscope body (not shown) and having a thin distal end portion and a thick intermediate portion. The apparatus 34 has a first turret 7 and a second turret 8. The first turret 7 has a disk-like shape. A through hole having almost the same diameter as that of the thick intermediate portion of the shaft 13 is formed in the central boss portion of the turret 7, and the intermediate portion of the shaft 13 is aligned with and inserted in this through hole. The screwed distal end portion of the shaft 13 is engaged in a screwed recess formed in the center of the upper surface of the second turret 8. The turret 7 is rotatable about a central axis 22 of the shaft 13 as the center. The second turret 8 has a disk-like upper plate portion 8b having said screwed recess formed in the center thereof, a cylindrical central portion 8c, and a cylindrical outer peripheral portion 8d. The central portion 8c is integrally provided to the center of the upper plate portion 8b to project downward. The outer peripheral portion 8d is integrally provided to the outer edge of the upper plate portion 8b to project downward. The downwardly projecting boss portion of the first turret 7 is in contact with the upper surface of the upper plate portion 8b for decreasing a frictional force these between. As a result, the first turret 7 can be rotated by the shaft 13 relative to the second turret 8.

The central portion 8c of the second turret 8 extends through a cylindrical central portion 9c located at the center of a third turret 9. Hence, the turret 9 is supported to be rotatable about the central axis 22 as the center relative to the second turret 8. The third turret 9 has a disk-like lower plate portion 9b, said central portion 9c, an annular portion 9d, and four projecting portions 9e. The central portion 9c is integrally provided to the center of the lower plate portion 9b to project upward. The annular portion 9d is integrally provided to the lower plate portion 9b to project upward from a portion spaced apart from the outer circumference of the lower plate portion 9b by a predetermined distance and is coaxial with the central portion 9c. The four projecting portions 9e are separate from the annular portion 9d by a predetermined distance and project upward from the lower plate portion 9b. These projecting portions 9e are formed on a circle having the central axis 22 as the center at an angular interval of 90°. The upper surfaces of the projecting portions 9e are inclined upward from the central side toward the outer side of the turret 9 by an angle of inclination of 45° with respect to the illumination optical axis 11.

In this manner, the first to third turrets 7, 8, and 9 are rotatable about the same central axis 22 as the center independently of each other. A small-diameter lower end portion 8e of the central portion 8c of the second turret 8 has a narrow tip male thread portion and is provided to project downward through a through hole formed at the center of a disk-like base 10 fixed to the microscope body, and a nut 14 is threadably engaged with the male thread formed on the narrow tip portion. As a result, the central portion 8c is rotatably supported by the base, by which in turn the central portion 9c of the third turret 9 is rotatably supported. Thus, the second and third turrets 8, 9 may be relatively rotated in independent manner. Boss sections are formed on the upper and lower surfaces of the central portion 9c for decreasing a frictional force between the second turret 8 and the base 10. The large-diameter intermediate portion of the shaft 13 which is inserted through the first turret 7 has a length slightly larger than the thickness of the central portion of the first turret 7, so that the first turret may be prevented from chattering in an axial direction. Also, the length of the lower end portion 8e is designed to be slightly larger than the thickness of the base 10 to prevent chattering of the second turret 8 in an axial direction. Further, the length of the central portion 9c of the third turret 9 is set to be slightly smaller than the central portion 8c of the second turret 8 to prevent axial-direction chattering of the third turret 9.

Next, there will be described a positioning click mechanism for defining the rotational position of the respective turrets 7, 8, 9 about the central axis 22 in a 90°-interval, with reference to FIGS. 1B and 1C.

Figure 1B:
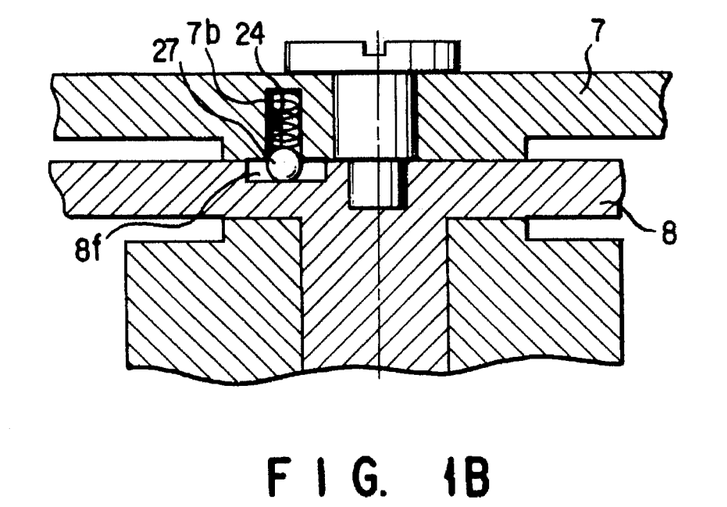
FIGS. 1B and 1C are enlarged sectional views respectively showing parts of the apparatus shown in FIG. 1A which are enclosed by a circle.

As shown in FIG. 1B, the lower surface of the boss portion of the first turrets 7 is provided with a blind hole 7b which vertically extends. A coil spring 24 is housed in the vertical hole 7b, lower end of which supports a ball 27. The portions of the upper surface of the second turret 8, which may be faced with the ball 27, have four positioning recesses 8f which are located around the central axis 22 and separated from each other by 90° in a circumferential direction. The first and second turrets 7, 8 are so assembled that the ball 27 is always pressed onto the upper surface of the second turret 8 by the spring 24. In this assembly, when the first turret 7 is rotated, the ball 27 rolls on the upper surface of the second turret 8, and then it reaches any one of the positioning recessed 8f, falling into the recess 8f, thereby enabling the click positioning of the first turret 7 against the second turret 8.

Figure 1C:
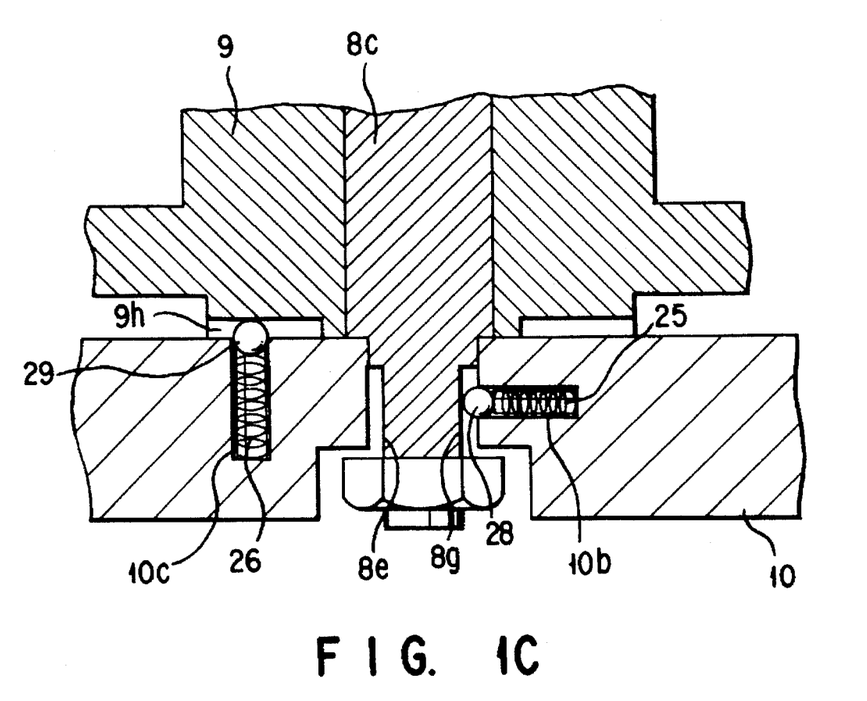

As shown in FIG. 1C, the inner surface defining the through hole of the base 10, in which the lower end portion 8e of the second turret 8 is inserted, is provided with a blind hole 10b which extendo horizontally.

A coil spring 25 is housed in the horizontal hole 10b, end of which supports a ball 28. The peripheral surface of the lower end 8e of the second turret 8, which may be faced with the ball 28, has four positioning recesses 8g which are located around the central axis 22 and separated from each other by 90° in a circumferential direction.

The second turret 8 and the base 10 are so assembled that the ball 28 is always pressed onto the peripheral surface of the end portion 8e by the compressed spring 25. In this assembly, when the second turret 8 is rotated, the ball 28 rolls on the periphery of the end portion 8e, and when it reaches any one of the positioning recesses 8g, it falls into the recess 8g, thereby enabling the click positioning of the second turret 8 against the base 10.

The portion of the upper surface of the base 10 which faces the boss portion of the third turret 9 is provided with a vertical blind hole 10c for receiving a coil spring 26 which supports a ball 29 at its upper end. Four positioning recess 9h are formed in the parts of the lower surface of the boss portion of the third turret 9 which may face the ball 29.

After assembling of the third turret 9 and the base 10, the ball 29 is always pressed onto the lower surface of the third turret 9 by the compressed spring 26. When the third turret 9 is rotated about the central axis 22, the ball 29 rolls on the under surface of the third turret 9, and when it reaches the any one of the positioning recesses 9h, it falls into the recess 9h, thereby enabling the click positioning of the third turret 9 against the base 10.

It is desired that the elastic force of the coil spring 25 for positioning the second turret 8 against the base 10 is set to be larger that that of the coil spring 24 for positioning the first turret 7 against the second turret 8, so that when the first turret 7 is rotated, the second turret 8 is not rotated together with the first turret.

In the outer peripheral portion 8d of the second turret 8, four circular windows are formed on a circle having the central axis 22 as the center at an angular interval of 90°. Four excitation filters 2 having different characteristics are detachably mounted on these four windows with set rings 5a. The excitation filters 2 select illumination light (the optical axis of which is denoted by reference numeral 11) that emerges from a light-projecting unit 17 having a light source and a lens for projecting light emitted by the light source, and transmit illumination light having a specific wavelength therethrough.

In the space defined by the second and third turrets 8 and 9, four dichroic mirrors 4 having different characteristics are mounted on a circle having the central axis 22 as the center at an angular interval of 90°. One end portion of each dichroic mirror 4 is detachably mounted to the corresponding projecting portion 9e of the turret 9 with a leaf spring 6 having a proximal end fixed to the upper surface of the lower plate portion 9b and a distal end extending along the inclined upper surface of the corresponding projecting portion 9e. An end portion of each dichroic mirror 4 on the opposite side to the projecting portion 9e is supported on the upper end of the annular portion 9d of the turret 9. Hence, each dichroic mirror 4 is inclined at 45° with respect to the illumination optical axis 11 and an observation optical axis 12.

Each dichroic mirror 4 selects excitation light selected by the corresponding excitation filter 2, reflects excitation light having a specific wavelength downward, and guides the reflected excitation light coaxially with the observation optical axis 12. The excitation light reflected by a dichroic mirror 4 passes through an objective lens 18 and reaches a sample surface 19. The sample is impregnated with a fluorochrome in advance. Thus, the sample surface 19 generates a fluorescence when the excitation light is incident on it. While this fluorescence is caused to form an image through the objective lens 18, it is transmitted through the corresponding dichroic mirror 4.

Circular through holes 9f are formed in the annular portion 9d of the turret 9 to be aligned with and face the windows formed in the outer peripheral portion 8d, so that the excitation light transmitted through the excitation filter 2 reaches the corresponding dichroic mirror 4. Circular through holes 9g and 10a are also coaxially formed in the lower plate portion 9b of the turret 9 and in the base 10, respectively, so that fluorescence components emerging from the sample surface 19 reach the corresponding dichroic mirrors 4. In this preferable embodiment, the projecting portions 9e and the annular portion 9d are arranged at positions to oppose the radial directions of the vicinities of the through holes 9g of the third turret 9.

In the first turret 7 and the upper plate portion 8b of the second turret 8, four windows and four through holes are formed respectively on concentric circles having the central axis 22 as the centers at an angular interval of 90°, such that the windows and the through holes can be aligned with each other. Four absorption filters 3 having different characteristics are detachably mounted to the four windows of the first turret 7 with set rings 5b.

Fluorescence that has been transmitted through a dichroic mirror 4 and a corresponding through hole in the upper plate portion 8b during image formation by the objective lens 18 reaches the absorption filter 3. The wavelength of the fluorescence is further selected by this absorption filter 3, and only a fluorescence component having the selected wavelength is transmitted through this absorption filter 3. A fluorescence component transmitted through the absorption filter 3 forms an image on an image formation plane 20 by the objective lens 18. This image can be observed with an observing section 21, e.g., an eyepiece or a television camera.

In this manner, according to this embodiment, the four types of absorption filters 3, the four types of dichroic mirrors 4, and the four types of excitation filters 2 are disposed on the first to third turrets 7, 8, and 9, and the respective turrets 7, 8, and 9 are rotatable independently of each other. When the turrets 7, 8, and 9 are rotated, a desired excitation filter 2, a desired absorption filter 3, and a desired dichroic mirror 4, of the four types each, can be disposed easily and quickly in the illumination/observation optical path in accordance with the fluorochrome to be used to the sample. At this time, the turrets 7, 8, and 9 are positioned by the positioning clicks.

Knurling portions 7a, 8a, and 9a are formed on the outer circumferential surfaces of the respective turrets 7, 8, and 9. Thus, the operator can easily rotate the turrets 7, 8, and 9.

According to this embodiment, the plurality of excitation filters 2, absorption filters 3, and dichroic mirrors 4 are arranged on the three turrets 7, 8, and 9 that are rotatable about the same central axis 22 as the center. The number of components can be decreased and the structure need not be complicated, and thus the apparatus can be manufactured at a low cost. Also, the central axis 22 is arranged on the central axis of the microscope body having an optical axis, so that the entire structure becomes simple and compact and has good operability, as composed to the case where the central axis 22 is shifted from the central axis of the microscope body. When the optical system switching apparatus is to be automatically operated by a computer or the like in accordance with a fluorescence component used by the sample, the respective turrets are automatically rotated. When the central axes of the respective turrets are common, a means for driving the turrets can be arranged easily.

It is also possible to arrange three turrets 7, 8, and 9 to be rotatable about different axes. In this case, knurling portions 7a, 8a, and 9a formed on the outer circumferential surfaces of the respective turrets 7, 8, and 9 are eccentric. Thus, when the operator touches one knurling portion to rotate the corresponding turret, he will not erroneously touch other knurling portions to rotate the corresponding turrets.

Even when the turrets 7, 8, and 9 are arranged coaxially, if rotating knobs are provided to the outer circumferences of the turrets 7, 8, and 9 or the outer diameters of the turrets 7, 8, and 9 are changed, this erroneous operation can be prevented.

Figure 2:
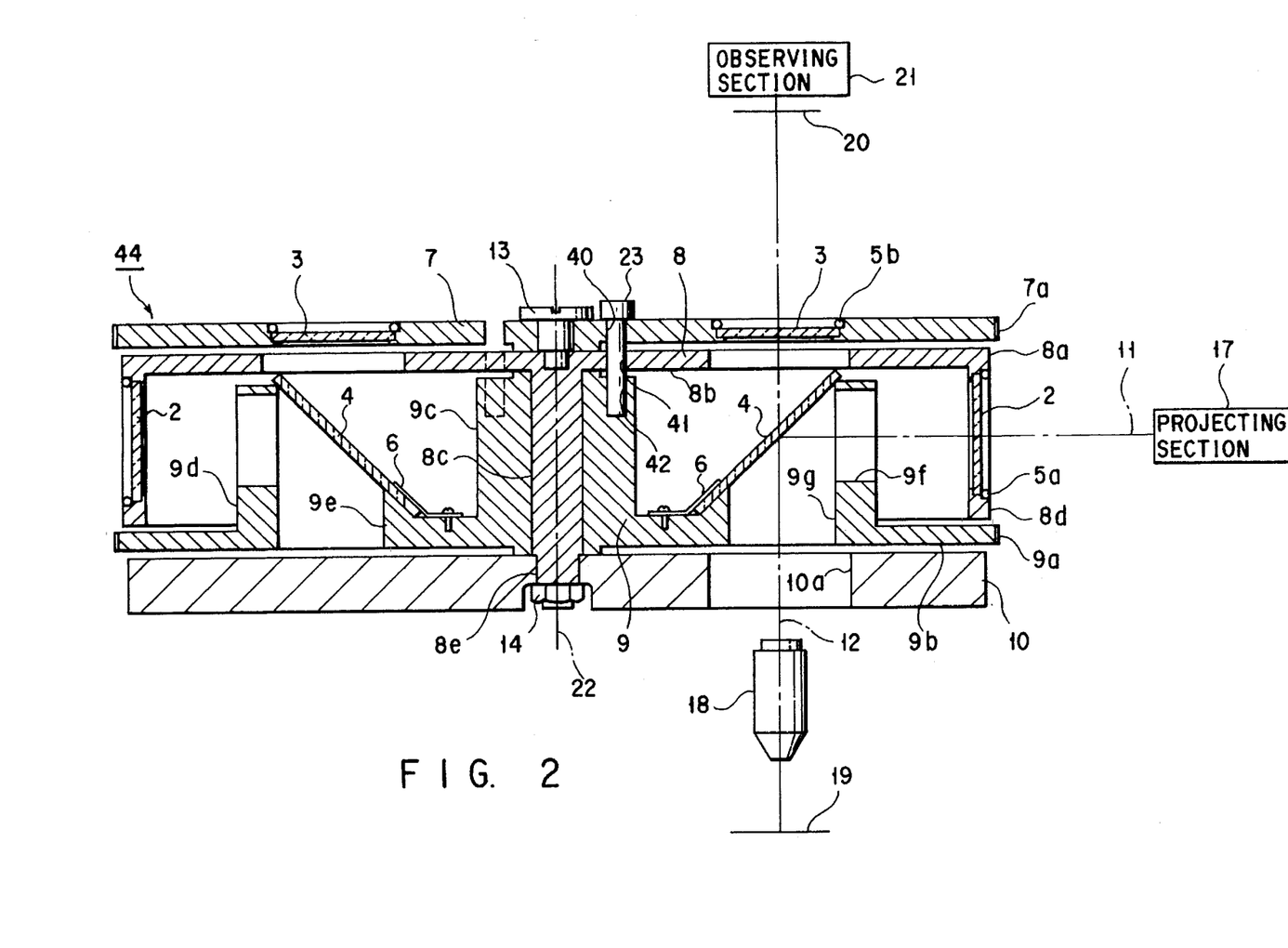
FIG. 2 is a side sectional view showing the second embodiment.

An optical system switching apparatus 44 according to the second embodiment of the present invention will be described with reference to FIG. 2. Referring to FIG. 2, the same constituent members and portions as in FIG. 1 are denoted by the same reference numerals, and a detailed description thereof will be omitted.

In this embodiment, an integrating means for rotating turrets 7, 8, and 9 simultaneously is provided. More specifically, four fitting holes 40 are formed in the first turret 7 to extend through it, four fitting holes 41 are formed in an upper plate portion 8b of the second turret 8 to extend through it, and four fitting holes 42 are formed in a central portion 9c of the third turret 9. These fitting holes 40, 41, and 42 have the same diameter and are at an equal distance from a central axis 22 and four fitting holes of each turret are separated from each other by 90°. Therefore, when the turrets 7, 8, and 9 are positioned 10 by positioning clicks (not shown) identical to those described above, the fitting holes 40, 41, and 42 are aligned on the same axis. A pin 23 is detachably inserted in one of the sets of fitting holes 40, 41, and 42 that communicate with each other.

In this embodiment, when the pin 23 is not fitted in the fitting holes 40, 41, and 42, the turrets 7, 8, and 9 can be rotated independently of each other in the same manner as in the first embodiment. When the pin 23 is inserted in one of the sets of fitting holes 40, 41, and 42, the turrets 7, 8, and 9 are rotated in an interlocked manner. Thus, when the operator operates at least one of knurling portions 7a, 8a, and 9a on the outer circumferences of the turrets 7, 8, and 9, the combination of an excitation filter 2, an absorption filter 3, and a dichroic mirror 4 can be switched to another combination simultaneously.

Accordingly, while the same effect as in the first embodiment can be obtained, the optical system switching apparatus 44 has an enhanced function. For example, if the operator usually performs observation by using a plurality of specific types of fluorochromes, he uses only certain combinations of the excitation filters 2, absorption filters 3, and dichroic mirrors 4 in accordance with the fluorochromes to be employed. Therefore, if a combination which is other than the preset combinations is required, an inconvenience is caused. In this case, it is convenient if the pin 23 is used to integrate the turrets 7, 8, and 9, so that only the preset combinations of the excitation filters 2, absorption filters 3, and dichroic mirrors 4 are available.

Figure 3:
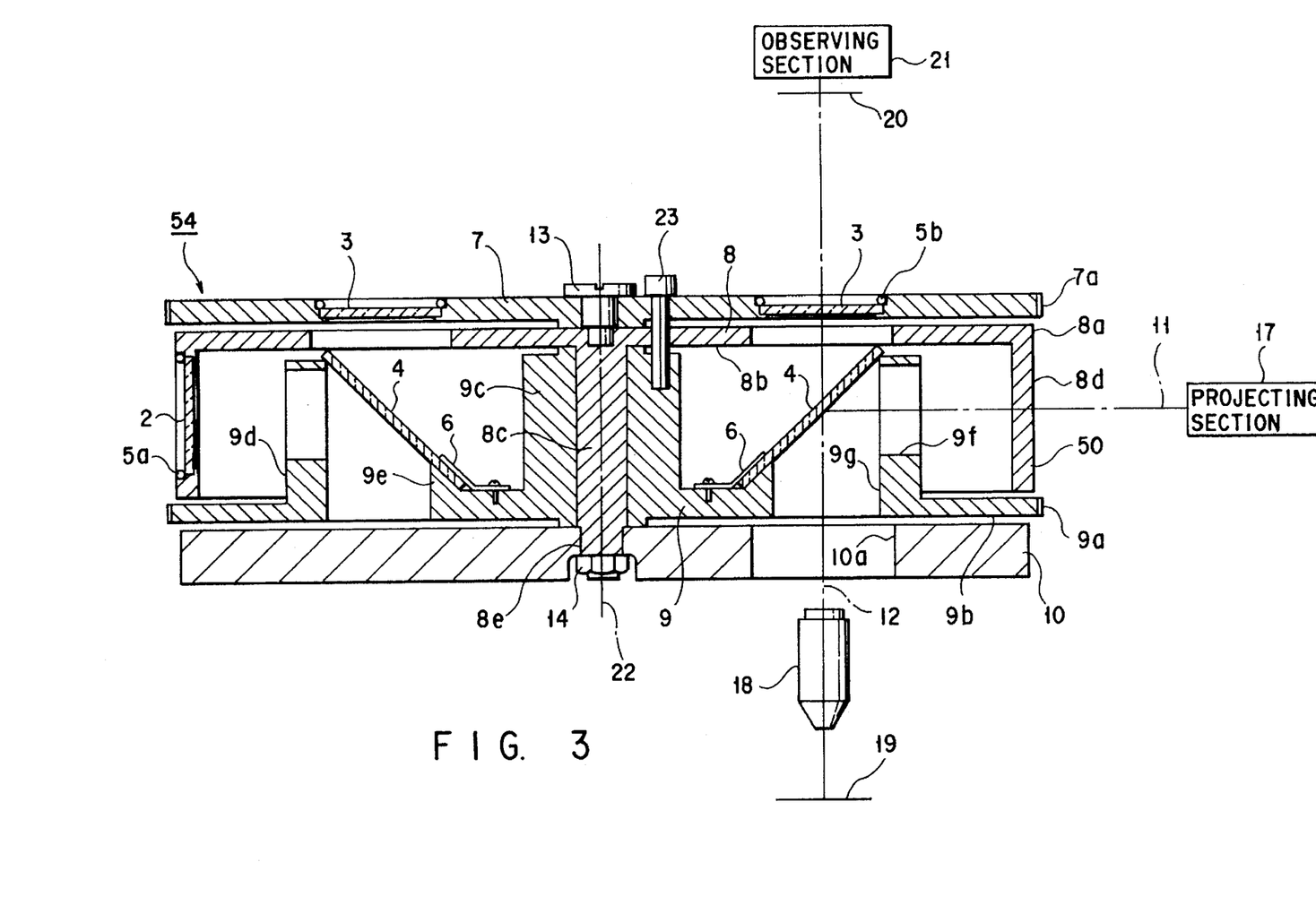
FIG. 3 is a side sectional view showing the third embodiment.

An optical system switching apparatus 54 according to the third embodiment of the present will be described with reference to FIG. 3. Referring to FIG. 3, the same constituent members and portions as in FIG. 2 will be denoted by the same reference numerals, and a detailed description thereof will be omitted.

In this embodiment, of the four windows which are formed in the outer peripheral portion 8d of the second turret 8 at an angular interval of 90° in the second embodiment and on which the excitation filters 2 are to be mounted, one window is not formed. Accordingly, only three excitation filters 2 are disposed. In an outer peripheral portion 8d, a portion which is at an angular distance of 90° from the excitation filters 2 and in which a window is not formed is defined as a light-shielding portion 50.

Positioning clicks are disposed on a second turret 8, in the same manner as in the first and second embodiments, so that the turret 8 is positioned every 90°. Accordingly, not only the three excitation filters 2 but also the light-shielding portion 50 faces a light-projecting unit 17. More specifically, when the operator rotates the turret 8, a desired one of the three excitation filters 2 can be disposed in the illumination optical path, and the light-shielding portion 50 can be used as the shutter, if the illumination light need be shielded, and the desired excitation filter be disposed in the illumination optical path.

The fluorochrome intensity of the fluorochrome impregnating the sample is decreased as it is continuously irradiated with excitation light. However, in this embodiment, if necessary, e.g., if observation is to be intermitted, the excitation light can be shielded by the light-shielding portion 50, thereby preventing a decrease in the fluorochrome intensity of fluorochrome. As the light-shielding portion 50 is formed in the turret 8 itself, it will not occupy an extra space.

In general, the light-projecting unit 17 of the reflected fluorescence microscope is arranged farther from the operator than the optical axis 12 of the objective lens 18, and is often arranged below the stage especially in an inverted microscope. For this reason, the shutter disposed in the illumination optical axis 11 becomes far from the operator and thus tends to have poor operability. In contrast to this, in this embodiment, since the light-shielding portion 50 can be operated only by rotating the turret 8 that the operator can operate easily, the operability of the light-shielding portion 50 is remarkably improved.

In the third embodiment, the light-shielding portion 50 is provided to the outer peripheral portion 8d of the turret 8. However, the arrangement of the light-shielding portion is not limited to this, but can be provided to a third turret 9. More specifically, if, of four through holes 9f corresponding to those of the second embodiment which are formed in the annular portion 9d to transmit illumination light therethrough, one through hole 9f is not formed, and if a portion of the annular portion 9d where this through hole 9f is not formed is arranged in the illumination optical axis 11 when the turret 9 is positioned by positioning clicks, then a light-shielding portion can be formed in the third turret 9. In this case, a dichroic mirror 4 corresponding to this through hole 9f becomes unnecessary. Also, in the first and second embodiments, it may be possible that a shield plate is attached to one of the windows of the second turret 8, to which an excitation filter is to be mounted.

In any of the above embodiments, four excitation filters 2, four dichroic mirrors 4, and four absorption filters 3 are disposed. However, one of the excitation filters 2, one of the dichroic mirrors 4, or one of the absorption filters 3 can be omitted, or larger numbers of excitation filters 2, dichroic mirrors 4, and absorption filters 3 may be provided. A combination of the excitation filter, absorption filter, and dichroic mirror which are considered as the best observing means for a specific sample may, for example, be sometimes accomplished by using the same dichroic mirror and the same excitation filter, while changing only the absorption filters, based or differing the staining and the observing points, and the developing of the properties of the excitation filter. Thus, the appropriate excitation filters, dichroic mirrors and absorption filters may be respectively used, which have the same characteristics, or the same wavelength band widths.

As is apparent from the above description, according to claim 1 of the present invention, when the operator selectively rotates the three turrets, appropriate excitation filter, dichroic mirror, and absorption filter can be switched separately and quickly, so that they can be combined arbitrarily and arranged in the optical path.

Accordingly, optimum excitation filter, dichroic mirror, and absorption filter can be easily arranged in the optical path only by rotating the turrets. Also, conventionally, when the operator wishes to change only one of these optical components to another type, each of the remaining two optical components must also be switched to another type. In the present invention, this inconvenience is solved. When this apparatus is used for fluorescence observation employing multi-color dyeing which is becoming popular in recent years, as the dichroic mirror and the absorption filter need not be exchanged in accordance with the excitation methods, the apparatus can be handled easily.

According to the embodiment shown in FIG. 3, if necessary, e.g., if observation is to be intermitted, the excitation light can be shielded by the light-shielding portion, thereby preventing a decrease in an fluorescent intensity of fluorochrome. As the light-shielding portion is formed in the turret itself, it will not occupy an extra space.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An optical system switching apparatus for a reflected fluorescence microscope, comprising:

a first turret having a first rotation center axis and a plurality of first windows which are formed at an equal distance from the first rotation center axis and on which absorption filters are mounted, said first turret being rotatable about the first rotation center axis;

a second turret having a second rotation center axis and a plurality of second windows which are formed at an equal distance from the second rotation center axis and on which excitation filters are mounted, said second turret being rotatable about the second rotation center axis;

a third turret having a third rotation center axis and a plurality of mounting portions which are formed at an equal distance from the third rotation center axis and on which dichroic mirrors are mounted, said third turret being rotatable about the third rotation center axis; and support means for supporting said first to third turrets to be rotatable independently of each other, and for optically aligning an arbitrary one of said excitation filters, an arbitrary one of said dichroic mirrors, and an arbitrary one of said absorption filters at respective rotational positions.

2. An apparatus according to claim 1, wherein the first to third rotation center axes are coaxial along a straight line so that said first to third turrets are independently rotatable about a uniform rotation center axis.

3. An apparatus according to claim 2, wherein said support means has a first support member for supporting said first turret to be rotatable about the uniform rotation center axis, and a second support member provided on said second turret for supporting said third turret to be rotatable about the uniform rotation center axis.

4. An apparatus according to claim 3, wherein said first support member has a shaft having a cylindrical intermediate portion, said first turret has a circular through hole through which said intermediate portion of said shaft extends, and said first support member is fixed to the second turret on the uniform rotation center axis.

5. An apparatus according to claim 3, wherein said second support member has a cylindrical central portion which is provided on said second turret to project coaxially with the uniform rotation center axis, and said third turret has a through hole through which said cylindrical central portion extends.

6. An apparatus according to claim 5, further comprising a base which is brought into contact with said third turret, said cylindrical central portion of said second support member having a distal end portion having a diameter smaller than that of the cylindrical central portion and a tip male thread portion having a diameter smaller than that of the distal end, said tip male thread portion of said cylindrical central portion of said second support member extending through a through hole formed in said base and being threadably engaged by a nut so that said cylindrical central portion of said second support member is rotatably supported by said base.

7. An apparatus according to claim 1, wherein:

said first turret has a first disk-like member in which the plurality of first windows are formed in a circumferential direction thereof at a predetermined interval, said second turret has a second disk-like member provided coaxially with said first disk-like member, said second disk-like member having a plurality of first through holes that can be aligned with the first windows and an annular member which is provided to project almost vertically from an outer circumference of said second disk-like member to be coaxial with said second disk-like member, said annular member having the plurality of second windows formed therein in a circumferential direction thereof at a predetermined interval to be perpendicular to the first through holes, and said third turret has a third disk-like member coaxially opposing said second disk-like member at a predetermined distance therefrom, said third disk-like member having second through holes that can be aligned with the first through holes, and said dichroic mirrors being mounted on said mounting portions of said third turret between said second and third disk-like members at an inclination of 45° with respect to the second windows and through holes.

8. An apparatus according to claim 7, wherein each of said mounting portions of said third turret has an inclined surface brought into contact with a portion of a corresponding one of said dichroic mirrors, said inclined surfaces being inclined at 45° with respect to a corresponding one of the second through holes, and an elastic biasing member for pressing a corresponding one of said dichroic mirrors to elastically sandwich said portion of said dichroic mirrors contacted by with said inclined surfaces.

9. An apparatus according to claim 1, wherein the first windows of said first turrets, the second windows of said second turrets, and said mounting portions of said third turrets are equal in number.

10. An apparatus according to claim 1, wherein the second windows of said second turrets are smaller in number than the first windows of said first turret.

11. An apparatus according to claim 1, further comprising means for coupling said first to third turrets so that said first to third turrets are rotatable together.

12. An apparatus according to claim 11, wherein said coupling means includes holes formed in said first to third turrets, respectively, that can be aligned with each other, and an insertion member that is inserted in the holes when the holes are aligned with each other, thereby coupling said first to third turrets.

13. An optical system switching apparatus of a reflected fluorescence microscope, which switches, in accordance with a given sample, between (i) excitation filters that select and transmit therethrough illumination light emitted by a light source, (ii) dichroic mirrors that select the illumination light transmitted through said excitation filters, reflect the selected illumination light toward a sample surface, and transmit fluorescence emerging from a sample surface, and (iii) absorption filters that select and transmit therethrough a fluorescence transmitted through said dichroic mirrors, said apparatus comprising:

a first turret on which a plurality of types of said absorption filters are disposed;

a second turret on which a plurality of types of said excitation filters are disposed;

a third turret on which a plurality of types of said dichroic mirrors are disposed; and support means for supporting said first to third turrets to be rotatable independently of each other, so that an arbitrary one of said excitation filters, an arbitrary one of said dichroic mirrors, and an arbitrary one of said absorption filters can be selected and arranged in an optical path.

14. An apparatus according to claim 13, wherein at least one of said second and third turrets comprises a light-shielding portion for shielding the illumination light.

* * * * *